United States Patent [19]

O'Nan et al.

[11] 3,751,797

[45] Aug. 14, 1973

[54] METHOD OF MAKING A CAPACITOR HAVING A SELF-DEPOLARIZING ELECTROLYTE

[75] Inventors: Thomas C. O'Nan, Charles W. Walters, James M. Booe, all of Indianapolis, Ind.

[73] Assignee: P. R. Mallory & Co., Inc., Indianapolis, Ind.

[22] Filed: Feb. 12, 1971

[21] Appl. No.: 115,040

Related U.S. Application Data

[62] Division of Ser. No. 862,049, Sept. 29, 1969, Pat. No. 3,601,665.

[52] U.S. Cl. ............... 29/570, 252/62.2, 317/230
[51] Int. Cl. ............................................. H01g 9/02
[58] Field of Search ............... 317/230; 252/62.2; 29/570

[56] References Cited
UNITED STATES PATENTS

| | | | |
|---|---|---|---|
| 2,616,953 | 11/1952 | Booe | 317/230 |
| 2,834,926 | 5/1958 | Booe | 317/230 |
| 3,255,388 | 6/1966 | Sporing | 317/230 |
| 2,910,633 | 10/1959 | Hovey | 317/230 |
| 3,243,316 | 3/1966 | O'Nan et al. | 317/230 X |
| 2,778,979 | 1/1957 | Booe | 317/230 |
| 3,296,500 | 1/1967 | Booe | 317/230 |

*Primary Examiner*—John W. Huckert
*Assistant Examiner*—William D. Larkins
*Attorney*—Richard H. Childress, Robert F. Meyer and Henry W. Cummings et al.

[57] ABSTRACT

A method of making a self-depolarizing, silver cathode, sulfuric acid electrolytic capacitor, wherein silver sulfate is provided in the electrolyte by providing in the electrolyte a metal sulfate which etches the silver cathode.

13 Claims, No Drawings proximate proportion to the leakage current. It precludes the liberation of hydrogen gas which may produce detrimental pressure within the device.

Although the silver sulfate system is highly satisfactory in most respects, there are certain minor shortcomings including:

1. the necessity of having the surface of the silver cathode quite clean;
2. the requirement of adding solid material (silver sulfate) to the cell in addition to adding the liquid electrolyte; and
3. the cathode capacitance may be slightly inadequate on a smooth silver cathode for an extremely high capacitance anode.

It therefore is an object of the present invention to provide high cathode capacitance to be used with high capacitance anodes.

It is another object of the present invention to provide a high capacitance device which retains its high capacitance during long periods of operation.

It is another object to reduce the number of steps required to manufacture high capacitance capacitors, particularly high capacitance per unit volume capacitors.

It is another object of the present invention to provide additives which clean the anode and/or cathode surface.

It is another object of the present invention to provide additives which etch the capacitor cathode.

It is another object of the present invention to provide a capacitor which does not form substantial amounts of gas, such as hydrogen during operation.

It is another object of the present invention to provide a capacitor which is inexpensive to manufacture.

It is another object of the present invention to provide a capacitor which will withstand increased vibration and shock.

In accordance with the present invention it has been found that the foregoing shortcomings may be overcome and the foregoing objects achieved by making a small addition of certain chemicals to the sulfuric acid electrolyte. These agents are in a high state of chemical valence and thus have moderate to high oxidative powers to convert the surface of the metallic silver cathode to silver sulfate.

In general the addition agents are based on the highest valence oxides of certain selected metals. Some may be added as the oxides while others may be added as derivatives of these oxides which are at least slightly soluble in sulfuric acid, and which in cooperation with the sulfuric acid will react with silver to form silver sulfate.

After the reaction, the reaction products of the addition agents are present in the electrolyte at least in part as sulfates. However, some other reaction products, particularly oxides may be formed in some cases. This particularly is true if a manganese addition agent is used.

Thus the electrolyte formed in accordance with the present invention will generally contain sulfuric acid, silver sulfate in an amount in excess of the solubility limit of silver sulfate in sulfuric acid, and at least some additional sulfate formed as a part of the reaction of the addition agent with sulfuric acid. All metal ions will at least in part be converted to their respective sulfates.

Also, preferably these chemical addition agents 1. do not liberate gas during dissolution of silver; and
2. do not contain deleterious elements or ions which would interfere with the formation of silver sulfate or interface with the operation of the anode. As an example, they should not contain or be composed of the halides which would form the corresponding insoluble silver halides.

Among the specific materials which may be utilized are the acid and soluble salts and complexes of elements having atomic numbers 23 through 26. This would include for example vanadium pentoxide ($V_2O_5$), chromic oxide ($CrO_3$), manganese hept-oxide ($Mn_2O_7$), ferric sulfate $Fe_2(SO_4)_3$ and ferric oxide ($Fe_2O_3$). Additional exemplary salts and complexes will be described hereinafter. Obviously, many of these substances may contain some impurities as well as the stated substances, and it will be recognized that the formulae shown may not represent the actual chemical structure of these substances, particularly in solutions, where complexes readily form and chemical reactions are complex.

These agents are believed to have one or more of the following effects on the capacitor system.

1. they etch the inside wall of the silver cathode case to provide enhanced surface area, thus increasing the cathode capacitance.
2. reaction of the cathode surface with the electrolyte normally automatically insures a clean surface.
3. they react with a sufficient amount of the silver case in the etching process to convert this silver to silver sulfate to be dissolved in the electrolyte, preferably in such quantity to form a saturated solution of the silver sulfate in the sulfuric acid electrolyte, most preferably with the formation of an excess above solubility to exist in the electrolyte as free solid material. This excess solid silver sulfate serves as a reservoir to maintain saturation as silver is plated out on the cathode during operation of the capacitor. In order for the device to exhibit a uniform capacitance it is preferred that the electrolyte be saturated at all times.

As to the amounts to be added, a lower limit would be about 0.1 percent by weight of the electrolyte. As a top limit, this is dictated by the limit of solubility with some of the additives while with others a limit of about 15 percent by weight would give little or no improvement over smaller amounts. For iron, and vanadium, with valence reductions of only one, the preferred limit would be about 5 percent. Where the valence reduction is 3 or 4 (chromate and manganese) an upper limit of preferably 2 percent should be sufficient. This results in an amount of metal sulfate in the electrolyte, over and above that resulting in silver sulfate, of about 0.1 to 15 percent by weight, preferably 0.2 to 10 percent.

As to the $H_2SO_4$ concentration a broad concentration range of 10 to about 70 percent by weight may be used with about 30 to 50 percent preferred.

Most of these materials require the presence of sulfuric acid which enters into the reaction for the formation of silver sulfate, as will be seen in the following equations.

These equations are given as illustrating the overall reactions. The present invention is not to be construed as limited thereby, as it is possible that the reactions occur by widely differing mechanisms and/or that one or more intermediate compounds or complexes are formed during the reaction(s).

METHOD OF MAKING A CAPACITOR HAVING A SELF-DEPOLARIZING ELECTROLYTE

A polarized electrolytic capacitor during operation should provide for the efficient movement of electric charge across the cathode-electrolyte interface boundary to enable a full charge to be stored in the dielectric film on the anode. Also, provision should be made for the efficient dissipation of this charge to the circuit.

These conditions may be achieved by:

1. employing a cathode of a suitable film-forming metal having a low voltage, high capacitance film formed thereon; or
2. applying to the surface of the cathode a layer of finely divided, substantially inert conductive material such as carbon or certain of the platinum metals or gold; properly applied, these materials will provide the necessary very high surface area; or
3. providing certain metal ions in the electrolyte which are capable of being electrodeposited on a cathode of a suitable metal and dissolved therefrom in substantially exact proportion to the current flowing back and forth across the cathode-electrolyte boundary.

In system (1) it is believed the current across the electrolyte-cathode interface which charges the anode is provided by creating a space charge across a rigid oxide dielectric film on the cathode. In system (2) it is thought that the current traversing the electrolyte-cathode junction discharges hydrogen or hydroxyl ions which are absorbed on the surface of the metal to yield a dielectric film. In system (3), it is believed the electrochemical discharge and dissolution of metal ions creates an ionic double layer in the electrolyte at the cathode surface, and the space charge across this layer exhibits a high capacitance.

All of the three above systems perform satisfactorily; however, each is best adapted to certain types and constructions of capacitors. As examples, system (1) is best adapted to wound foil constructions employing, for example aluminum or tantalum electrodes. Systems (2) and (3) are best adapted to the sintered tantalum powder anode type employing for example a silver or copper cathode which may also serve as the container for the electrolyte.

In the above systems, it is necessary that the cathode-electrolyte operating mechanism provide capacitance many times greater than that of the anode with which it is working. In the capacitor device, the capacitance of the anode is in series with that of the cathode, and the capacitance of the device bears a definite mathematical relationship with the capacitance of both electrodes according to the expression $1/C \text{ (device)} = 1/C \text{ (anode)} + 1/C \text{ (cathode)}$. In accordance with this equation, it will be apparent that for the device capacitance to nearly equal the true capacitance of the anode, the capacitance of the cathode must be about 100 times that of the anode. As an example, if the anode has a capacitance of 10 mf, the cathode must have a capacitance of 1000 mf for the device to exhibit nearly the capacitance of the anode.

In the case of high surface area anodes such as the sintered tantalum or niobium powder type, the capacitance is very high per device volume. The cathode mentioned above in system (1) does not provide sufficient capacitance without making the device abnormally large. In providing a device of the smallest possible size, the usual practice is to employ a combination of systems (2) and (3). According to U. S. Pat. No. 2,616,953 issued Nov. 4, 1952 to J. M. Booe, wherein a silver cathode container is employed with sulfuric acid electrolyte and a sintered tantalum anode, a moderately high cathode capacitance is achieved by virtue of an interaction between the silver cathode and the electrolyte during operation of the device to produce some silver ions in solution. This may provide sufficiently high cathode capacitance where the anode capacitance is not too high.

For high capacitance anodes, however, the cathode capacitance must be increased. This is usually accomplished by etching the cathode and applying finely divided platinum or carbon to the etched surface. This operation is generally tedious and costly, particularly when platinum is employed, as is the usual case where the silver cathode container is small. The operation generally involves:

1. cleaning the case,
2. applying a coat of masking lacquer part way down the inside wall,
3. etching the inside with nitric acid,
4. rinsing,
5. filling with chloroplatinic acid,
6. positioning an anode of platinum centrally in the case and applying electrolyzing current to plate a spongy deposit of platinum on the inner wall,
7. removing the anode and spent solution,
8. rinsing,
9. drying,
10. removing lacquer coating with solvent.

High cathode capacitance can also be achieved by maintaining the electrolyte saturated with silver sulfate which is soluble in sulfuric acid (i.e., 40 percent) electrolyte (about .7 percent at room temperature) with an excess to serve as a reservoir. This is in accordance with the teachings of U. S. Pat. No. 2,778,979 issued Jan. 22, 1957 to J. M. Booe. This system works in accordance with that described in (3) above, namely, the electrodeposition and electrodissolution of silver at the silver cathode in substantially direct proportion to the alternating current imposed across the capacitor electrodes. This electrochemical reaction is believed to result in the formation of an electrical double layer at the electrode electrolyte interface.

The exact mechanism of operation is not known, but it is likely that any separation of charge at the electrolyte electrode interface contributes a potential difference between the phases. Such potential difference may be due to a. charge transfer across the interface;
b. a selective distribution of ions across the interface because of unequal absorption of ions of opposite sign or of unequal distances from the electrode to absorbed layers of different ions;
c. orientation of polar molecules; or
d. formation of polar chemical bonds.

Whatever the mechanism, a smooth silver electrode in sulfuric acid which is saturated with silver sulfate generally exhibits a capacitance of at least about 100,000 microfarads per square inch of electrode surface.

Another advantage of this system is that employing an excess of silver sulfate in the electrolyte, over and above that amount which is soluble, provides a reservoir from which the solution is replenished as the silver ions in the solution are discharged at the silver cathode to plate silver thereon by the D.C. leakage current through the capacitor. This deposition of silver is in ap- $$6\ H_2SO_4 + 2\ CrO_3 + 6\ Ag \rightarrow 3\ Ag_2SO_4 + Cr_2(SO_4)_3 + 6\ H_2O \qquad (1)$$

$$5\ H_2SO_4 + V_2O_5 + 2\ Ag \rightarrow Ag_2SO_4 + 2\ V(SO_4)_2 + 5\ H_2O \qquad (2)$$

$$Fe_2O_3 + 3\ H_2SO_4 + 2\ Ag \rightarrow Ag_2SO_4 + 2\ FeSO_4 + 3\ H_2O \qquad (3)$$

$$Mn_2O_7 + 3\ H_2SO_4 + 6\ Ag \rightarrow 2\ MnO_2 + 3\ Ag_2SO_4 + 3\ H_2O \qquad (4)$$

$$2\ MnO_2 + 4\ H_2SO_4 + 2\ Ag \rightarrow Mn_2(SO_4)_3 + Ag_2SO_4 + 4\ H_2O \qquad (5)$$

In equation No. (4) $MnO_2$ is formed initially, and subsequently the $MnO_2$ is converted to manganese sulfate.

These equations are given to show the overall reactions. While the mechanisms are somewhat hypothetical they show the high oxide valence of the basic starting material. In practice however, in some cases certain derivatives of the oxide is best employed. As an example potassium permanganate would be employed instead of manganese hept oxide $Mn_2O_7$ because of the unstable nature of the latter. In the case of ferric iron it may be more practical to add this to the electrolyte as ferric sulfate since the oxide will convert to the sulfate as it slowly dissolves in the sulfuric acid electrolyte. Added to the electrolyte in these forms the reactions would be as follows:

$$2\ KMnO_4 + 8\ H_2SO_4 + 8\ Ag \rightarrow 4\ Ag_2SO_4 + K_2SO_4 + 8\ H_2O + Mn_2(SO_4)_3 \qquad (6)$$

$$Fe_2(SO_4)_3 + 2\ Ag \rightarrow Ag_2SO_4 + 2\ FeSO_4 \qquad (7)$$

The invention is not restricted to the use of one of these salts, complexes or oxides or derivitives thereof, but also includes mixtures of the agents and especially includes the duplex metal salts which are advantageous in some circumstances. There are many parameters of the capacitor deivce which must be taken into account in the selection of and the amount of addition agent to be added to the electrolyte. Among these are: (1) size, (2) temperature coefficient of capacitance, (3) operating voltage, (4) operating temperature, and (5) operating life.

Perhaps most consideration should be given to the size of device, in that the ratio of volume to cathode area changes appreciably with the diameter. As an example, a device 1 cm long and 0.2 cm in diameter will have a volume of about 0.031 ml and a cathode area of about 0.625 sq. cm or a cathode to volume ratio of about 20. Comparing this to a device 1 cm long and 1 cm in diameter, the cathode will have an area of about 3.14 sq. cm and a volume of about 0.73 ml or a cathode to volume ratio of only about 4.

This shows that in a larger device, the cathode will usually be much more severely etched but the concentration of the resulting silver sulfate in the electrolyte, will usually be less than in a smaller device. Considering the device size aspect and the other factors mentioned above, it may be advantageous to use a mixture of the addition agents or certain duplex salts or mixtures thereof to arrive at the optimum or desired cathode etch and silver sulfate concentration in the electrolyte. The limited solubility of some of the addition agents also may suggest the use of mixtures or certain duplex salts.

Some examples of duplex salts which may be employed are the ferric compounds of chromate, dichromate, and vanadate. In such compounds, there is not only the reduction of the chromium or vanadium, but there is also the reduction of ferric to ferrous. This is believed to occur according to the following reactions with silver, which may involve one or more intermediate steps, and the invention is not to be construed as limited by the accuracy of these equations.

$$Fe_2(Cr_2O_7)_3 + 20\ Ag + 21\ H_2SO_4 \rightarrow 10\ Ag_2SO_4 + 2\ FeSO_4 + 3\ Cr_2(SO_4)_3 + 21\ H_2O \qquad (8)$$

$$FeVO_4 + 2\ Ag + 4\ H_2SO_4 \rightarrow Ag_2SO_4 + FeSO_4 + V(SO_4)_2 + 4\ H_2O \qquad (9)$$

$$2\ Fe_2(CrO_4)_3 + 22\ Ag + 24\ H_2SO_4 \rightarrow 11\ Ag_2SO_4 + 4\ FeSO_4 + 3\ Cr_2(SO_4)_3 + 24\ H_2O \qquad (10)$$

Particularly where it is desired or required to increase the silver sulfate content in the electrolyte of devices which are to operate at elevated temperatures for extended periods of time and, therefore, requires a greater reservoir of silver sulfate, it may be advantageous to employ the duplex salts of silver with one or more other elements selected from, manganese, chromium and/or vanadium.

Examples of these are shown in the following chemical equations, with the comments previously made in regard to equations in this application applying to these as well.

$$2\ AgMnO_4 + 8\ Ag + 8\ H_2SO_4 \rightarrow 5\ Ag_4SO_4 + Mn_2(SO_4)_3 + 8\ H_2O \qquad (11)$$

$$2\ Ag_2CrO_4 + 6\ Ag + 8\ H_2SO_4 \rightarrow 5\ Ag_2SO_4 + Cr_2(SO_4)_3 + 8\ H_2O \qquad (12)$$

$$Ag_3VO_4 + Ag + 4\ H_2SO_4 \rightarrow 2\ Ag_2SO_4 + V(SO_4)_2 + 4\ H_2O \qquad (13)$$

It is to be noted that large amounts of the silver sulfates are obtained from the addition agent as well as from the case. Thus a thinner layer of silver may be utilized as the cathode when silver containing addition agents are utilized.

Not only do these electrolyte additives provide high cathode capacitance and thus high initial device capacitance, but also they are effective over long periods of device operation at elevated temperatures. For instance many groups of capacitors made of a 40 percent sulfuric acid solution in water electrolyte having ½ and 1 percent $CrO_3$ initially in the electrolyte have been life tested to as long as 2,000 hours at 175°C, or as long as 10,000 hours at 85° C with excellent results. These results were obtained with high capacitance per unit volume using high capacitance anodes. Device capacitances generally of 700 uf were obtained with a device size of about ¾ inch long × ⅜ inch in dia.

In addition to the advantages previously mentioned, another advantage particularly including the chromium and manganese materials, is their inherent capability of producing a clean surface on both the anode and the cathode. It is a rather common occurrence in the manufacture of these devices by the current method that the porous anode, for example, tantalum, does not readily wet with the electrolyte, possibly due to the presence of an oily film. These addition agents are helpful in removing detrimental films not only from the anode, but also from the cathode surface.

Furthermore, the use of these addition agents in the electrolyte has one or more of the following advantages over the current method of pre-etching the cases and applying a coating of platinum black, or finely divided carbon.

1. Provides cathode capacitance generally comparable to that of platinum black.

2. Provides static depolarization for the D.C. leakage through the capacitor by the electrodeposition of silver onto the cathode, thus precluding the possible formation of a substantial amount of hydrogen gas within the device.

3. Lower cost, in that all the operations required in the use of platinum black are usually obviated.

In the practice of this invention it is merely necessary to have the addition agent in the electrolyte and introduce the proper amount into the cathode case by the usual means, such as with a measuring syringe then insert the anode and close the device in the usual manner.

In some instances, when extremely high cathode capacitance is desired, it may be desirable to utilize a layer of finely divided platinum and/or carbon together with the addition agents and electrolyte of the present invention. In this event it is often preferred to use wholly or in part silver containing duplex salts such as those mentioned above to minimize the possible removal of platinum and/or carbon which has been applied to the silver case.

Although not necessary, it may be preferable to heat the finished device at some elevated termperature such as 50° to 100°C for a short period such as 15 minutes to 100 hours, toward completing the reaction between the silver case and the additive. Devices having large anodes require higher temperatures and/or longer times for the electrolyte to diffuse out of the pores of the anode to react with the silver cathode. Furthermore, longer times may be required in cases where an intermediate compound such as an oxide is formed before conversion to the sulfate occurs. One example of this is the formation of manganese dioxide prior to the formation of manganese sulfate.

In addition to the etching action of these addition agents on the silver cathode to increase the surface area and the generation of silver sulfate, there is apparently a further action contributing to capacitance enhancement by the reduction products of these materials.

As an example, in the case of chromic oxide in the sulfuric acid electrolyte, the chromium is reduced from a valence of six to a valence of three during oxidation of the silver. The resulting chromium product is chromic sulfate $(Cr_2(SO_4)_3)$ according to the chemical equation given previously. It has been shown that when pure chromium sulfate is added to sulfuric acid electrolyte there is an increase in capacitance over that when sulfuric acid is used alone and over that when sulfuric acid and silver sulfate (Examples 1–4) are used. The increase in capacitance is generally about 15 percent or higher over that obtained when sulfuric acid and silver sulfate are used without an addition agent.

Furthermore, capacitors having electrolytes composed of sulfuric acid, silver sulfate and a metal sulfate of a metal having an atomic number of 23 through 26 do not show significant decrease in capacitance after operation for a considerable period of time at elevated temperature, as is observed with electrolytes containing sulfuric acid (Examples 16–18).

It is not understood why this unexpected result is obtained, but it may be due to oxidation-reduction of the chromium ion between valences 3 and 2 at the cathode and/or anode electrolyte interface by the flow of alternating current across this boundary to contribute to the formation of an ionic double layer, thus causing an enhancement of the cathode capacitance.

EXAMPLES 1–4

In order to show the efect of these electrolyte addition agents on the capacitance of a silver electrode the following tests were performed.

These tests were made by providing two smooth fine silver wire electrodes each 0.037 in diameter. Each wire was surrounded by a tightly fitting tube of tetrafluoroethylene to shield the upper portion of each wire, leaving 0.25 inch at the bottom to be exposed to the electrolyte. This provided approximately 0.03 square inch area of each electrode exposed to the electrolyte. The two insulated electrode wires were positioned close together and suspended in the electrolyte.

New electrodes were used in each of the tests. In the tests with the subject addition agents, the solution was warmed to 85° C for a few minutes to insure completion of the reaction with the electrodes. A small galss cell, 5/32 inch I.D. × ½ inch long, containing 0.1 ml of the electrolyte was used.

Capacitance measurements were made with a low value of AC bridge excitation voltage (0.05 VAC) to minimize electrochemical attack on the electrodes. Capacitance measurements were made first with 39 percent sulfuric acid then in 39 percent sulfuric acid saturated with $Ag_2SO_4$ then in 39 percent sulfuric acid containing the various addition agents.

| Example No. | Electrolyte | Capacitance,(MFD)/.03in |
|---|---|---|
| 1 | $H_2SO_4$ | 7.0 |
|   | $H_2SO_4 + Ag_2SO_4$ (About 0.7% in solution) | 1500 |
|   | $H_2SO_4 + 1\% V_2O_5 \rightarrow Ag_2SO_4$(About 0.7%) in solution) + $V(SO_4)_2$ | 1750 |
| 2 | $H_2SO_4$ | 7.1 |
|   | $H_2SO_4 + Ag_2SO_4$ (About 0.7% in solution) | 1160 |
|   | $H_2SO_4 + 1\% Cr_2O_3 \rightarrow Ag_2SO_4$(About 0.7% in solution) + $Cr_2(SO_4)_3$ | 2200 |
| 3 | $H_2SO_4$ | 7.3 |

| | |
|---|---|
| $H_2SO_4 + Ag_2SO_4$ (About 0.7% in solution) | 1500 |
| $H_2SO_4 + 1\%$ $KMnO_4 \rightarrow$ $Ag_2SO_4$(About 0.7% in solution) $+ Mn_2(SO_4)_3$ | 1900 |
| $H_2SO_4$ | 8.3 |
| $H_2SO_4 + Ag_2SO_4$ (About 0.7% in solution) | 1100 |
| $H_2SO_4 + 3\%$ $Fe_2(SO_4)_3 \rightarrow$ $Ag_2SO_4$(About 0.7% in solution) $+ FeSO_4$ | 2200 |

Examination of the electrodes after each test showed them to be appreciably etched. Also, the electrolyte contained an excess of $Ag_2SO_4$ as evidenced by the presence of free crystals.

It will be noted from the above results the effect of $Ag_2SO_4$ on the capacitance and an increased effect due to the use of the subject addition agents, in some cases being almost double. If a value of capacitance of 1,500 mf is taken for $Ag_2SO_4$, and calculating from the 0.03 square inch area shows a capacitance of 50,000 mf per square inch, since the two like electrodes are operating in series, this would be 100,00 uf per square inch for each electrode. On the same basis, the addition agents showing the highest value, the capacitance per square inch approaches 150,000 mf.

EXAMPLES 5–10

In the following examples the reduction product of $CrO_3$, namely chromic sulfate $Cr_2(SO_4)_3$ was added to 39 percent $H_2SO_4$ electrolyte and assembled with 500 mf rated anodes into silver cathode cases measuring 0.375 inch dia. × 0.750 inch long. This group of examples compares the device capacitance with and without the $Cr_2(SO_4)_3$ on both smooth silver cathode and cases which were etched with 39 percent $H_2SO_4$ containing 1 percent $CrO_3$. After the reaction, this electrolyte was thoroughly removed to insure no $Ag_2SO_4$ remained.

Also included was a group of like capacitors made with an electrolyte 39 percent $H_2SO_4 + 1$ percent $CrO_3$, and a like group having the conventional platinum black coating on the pre-etched cathode with 39 percent $H_2SO_4$.

The value of capacitance for each group is the average of initial values of 5 units.

Where $Cr_2(SO_4)_3$ was used, the concentration was 2 percent by weight because this is the approximate amount formed when a starting electrolyte of 1 percent $CrO_3$ is employed.

| Example No. | Description of Ingredients Used in Assembling | Average Initial Capacitance |
|---|---|---|
| 5 | Smooth silver cathode case $H_2SO_4$ electrolyte | 95 mf |
| 6 | Pre-etched silver cathode case $H_2SO_4$ electrolyte | 381 mf |
| 7 | Smooth silver cathode case $H_2SO_4 + 2\%$ $Cr_2(SO_4)_3$ electrolyte | 420 mf |
| 8 | Pre-etched silver cathode case $H_2SO_4 + 2\%$ $Cr_2(SO_4)_3$ electrolyte | 439 mf |
| 9 | Smooth silver cathode case $H_2SO_4 + 1\%$ $CrO_3$ | 513 mf |
| 10 | Pre-etched silver cathode case plated with platinum black – $H_2SO_4$ electrolyte | 518 mf* |

*average of 4 units - one low capacitance value not used in the average. The average of all 5 units is 455 mf.

The effect of $Cr_2(SO_4)_3$ can be seen in the above results by comparing Example 8 with Example 6 and Example 9 with Example 7. Also, the effect of $CrO_3$ in the electrolyte (reaction product effect) on the capacitance can be seen by comparing Example 10 with Example 6 and Example 8.

It will also be observed that the capacitance is about equivalent to that of units made with a platinized cathode (Example 10).

EXAMPLES 11–15

In a similar set of experiments, employing high capacitance anodes in a smaller silver case, the initial capacitance values bore the same relationship as in the previous experiment.

In these experiments, anodes were employed having a rating of 450 mf which were assembled in silver cathode cases having outside dimensions of 0.20 inch diameter and 0.6 inch long.

In addition to the comparison of capacitance of pre-etched vs. smooth silver cases and sulfuric acid alone vs. the same containing the reaction product of $CrO_3$ and silver, namely $Cr_2(SO_4)_3$, a group of like units were made with smooth silver and electrolyte containing 1 percent $CrO_3$.

The capacitance values given in the following table are averages of 5 units in each group.

| Example No. | Description of Ingredients Used in Assembling Device | Average Initial Capacitance |
|---|---|---|
| 11 | Smooth silver cathode cases, $H_2SO_4$ electrolyte | 125 mf |
| 12 | Pre-etched silver cathode cases, $H_2SO_4$ electrolyte | 234 mf |
| 13 | Smooth silver cathode cases, $H_2SO_4$ electrolyte containing 2% $Cr_2(SO_4)_3$ | 160 mf |
| 14 | Pre-etched silver cathode cases, $H_2SO_4$ electrolyte containing 2% $Cr_2(SO_4)_3$ | 241 mf |
| 15 | Smooth silver cathode cases, $H_2SO_4$ electrolyte containing 1% $CrO_3$ | 432 mf |

Similar results would be obtained with the reduction products of vanadium, manganese and iron compounds in increasing the cathode capacitance.

EXAMPLES 16–18

The following data was accumulated from life test groups having anodes of over 700 mf rated at 15 volts in a silver cathode case measuring about 0.375 inch dia. and 0.750 inch long, show the capacitance maintenance over a period of operation of 4,000 hours at 85° C.

In this test are three groups of four capacitors each. One group was made with ½ percent $CrO_3$ in the electrolyte while another group was made with 1 percent $CrO_3$. A third or control group contained no addition agent in the electrolyte but the cathode cases were pre-etched then plated with platinum black sponge in the conventional manner.

| Ex. No. | | Description of Additive | Initial C | C at 4000 hrs. | Change in C |
|---|---|---|---|---|---|
| 16 | 1 | Control | 738 mf | 660 mf | −10.6% |
| | 2 | " | 717 mf | 635 mf | −11.5% |
| | 3 | " | 718 mf | 652 mf | −9.2% |
| | 4 | " | 744 mf | 681 mf | −8.5% |
| 17 | 1 | .5% $CrO_3$ | 735 mf | 713 mf | −3.0% |
| | 2 | " | 743 mf | 735 mf | −1.1% |
| | 3 | " | 737 mf | 717 mf | −2.7% |
| | 4 | " | 735 mf | 726 mf | −1.2% |
| 18 | 1 | 1% $CrO_3$ | 721 mf | 706 mf | −2.1% |
| | 2 | " | 731 mf | 715 mf | −2.2% |
| | 3 | " | 728 mf | 705 mf | −3.2% |
| | 4 | " | 737 mf | 724 mf | −1.8% |

The averages of the capacitance change for each group are 9.9 percent for the control group, 1.99 percent for the group to which ½ percent by weight $CrO_3$ was added to the electrolyte and 2.3 percent for the group to which 1 percent $CrO_3$ was added to the electrolyte.

These data clearly show increased stability of capacitors made with the addition agents.

We claim:

1. A method of making a capacitor comprising:
   inserting into a capacitor container having a silver cathodic internal surface, materials resulting in a capacitor electrolyte comprising:
   a. an acid solution containing predominately sulfuric acid;
   b. silver sulfate dissolved in said acid solution; and
   c. at least one metal sulfate of a metal having an atomic number from 23 through 26,
   and placing a film forming metal anode into said container so that said electrolyte is in contact with said internal surface and said anode.

2. A method according to claim 1 in which said metal sulfate is at least in part the reaction product obtained from the reduction of at least one high valence addition agent having high oxidation powers which is at least partially soluble in said acid solution.

3. A method according to claim 1 in which said solution also contains oxide material.

4. A method according to claim 3 in which said metal sulfate is manganese sulfate and said solution contains manganese oxide.

5. A method according to claim 2 in which said agent is selected from the group consisting of soluble salts and complexes of chromic oxide, vanadium pentoxide, manganese hept-oxide, ferric sulfate, and mixtures thereof.

6. A method according to claim 2 in which said agent contains more than one metal having an atomic number between 23 and 26.

7. A method of making a capacitor comprising the steps of providing a film-forming metal anode spaced from a silver cathode, and contacting the anode and the cathode with an electrolyte including an acid solution containing sulfuric acid and silver sulfate in the acid solution and a metal sulfate of at least one metal selected from the group of chromium, vanadium, manganese and iron.

8. The method of claim 7, wherein the acid solution is aqueous.

9. The method of claim 7, wherein the electrolyte includes silver sulfate in an amount in excess of the solubility limit of silver sulfate in the sulfuric acid.

10. The method of claim 7, wherein the sulfate of the metal is formed by the step of reacting sulfuric acid with an addition agent selected from the acid and soluble salts and complexes of a metal selected from the group of chromium, vanadium, manganese, iron and mixtures thereof.

11. The method of claim 10, wherein the addition agent is selected from vanadium pentoxide ($V_2O_5$), chromic oxide ($CrO_3$), manganese hept-oxide ($Mn_2O_7$), ferric sulfate $Fe_2(SO_4)_3$, ferric oxide ($Fe_2O_3$), potassium permanganate ($KM_nO_4$), and mixtures thereof.

12. The method of claim 7, wherein the electrolyte etches the silver cathode to enhance the cathode surface area.

13. A method of making a capacitor comprising the steps of providing a film-forming metal anode spaced from a silver cathode, and contacting the anode and the cathode with an electrolyte including an aqueous acid solution containing sulfuric acid and silver sulfate in the acid solution and a metal sulfate of at least one metal selected from the group of chromium, vanadium, and manganese.

* * * * *

UNITED STATES PATENT OFFICE
CERTIFICATE OF CORRECTION

Patent No. 3,751,727    Dated 8-14-73

Inventor(s) Thomas C. O'Nan, Charles W. Walters, James M. Booe

It is certified that error appears in the above-identified patent and that said Letters Patent are hereby corrected as shown below:

Insert in column 1 as the first paragraph "This is a division of application Serial No. 862,049 filed September 29, 1969, now U. S. Patent 3,601,665".

Column 5, line 52 change "deivce" to ---device---.

Column 6, line 48, change "$\rightarrow 5\ Ac_4SO_4$" to --- $\rightarrow 5\ Ag_2SO_4$---.

Column 8, line 12, change "sulfate (Examples 1-4) are" to ---sulfate are used (Examples 1-4)---.

Column 8, line 19, change "show significant" to ---show a significant---.

Column 8, line 61, change "(About 0.7%)" to ---(About 0.7%---.

Column 9, line 33, change "cathode" to ---cathodes---.

Signed and sealed this 25th day of June 1974.

(SEAL)
Attest:

EDWARD M. FLETCHER, JR.
Attesting Officer

C. MARSHALL DANN
Commissioner of Patents